Patented Mar. 9, 1926.

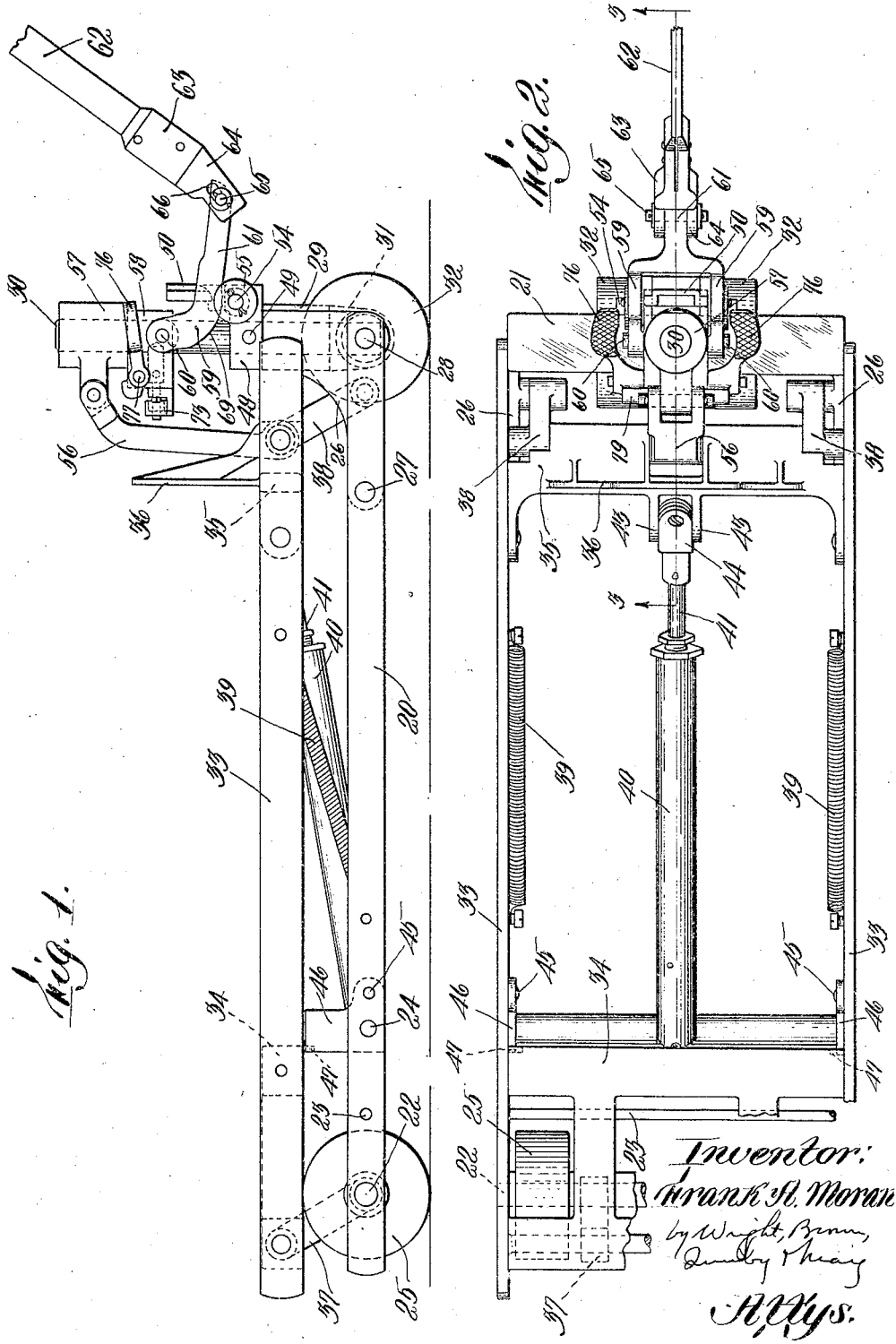

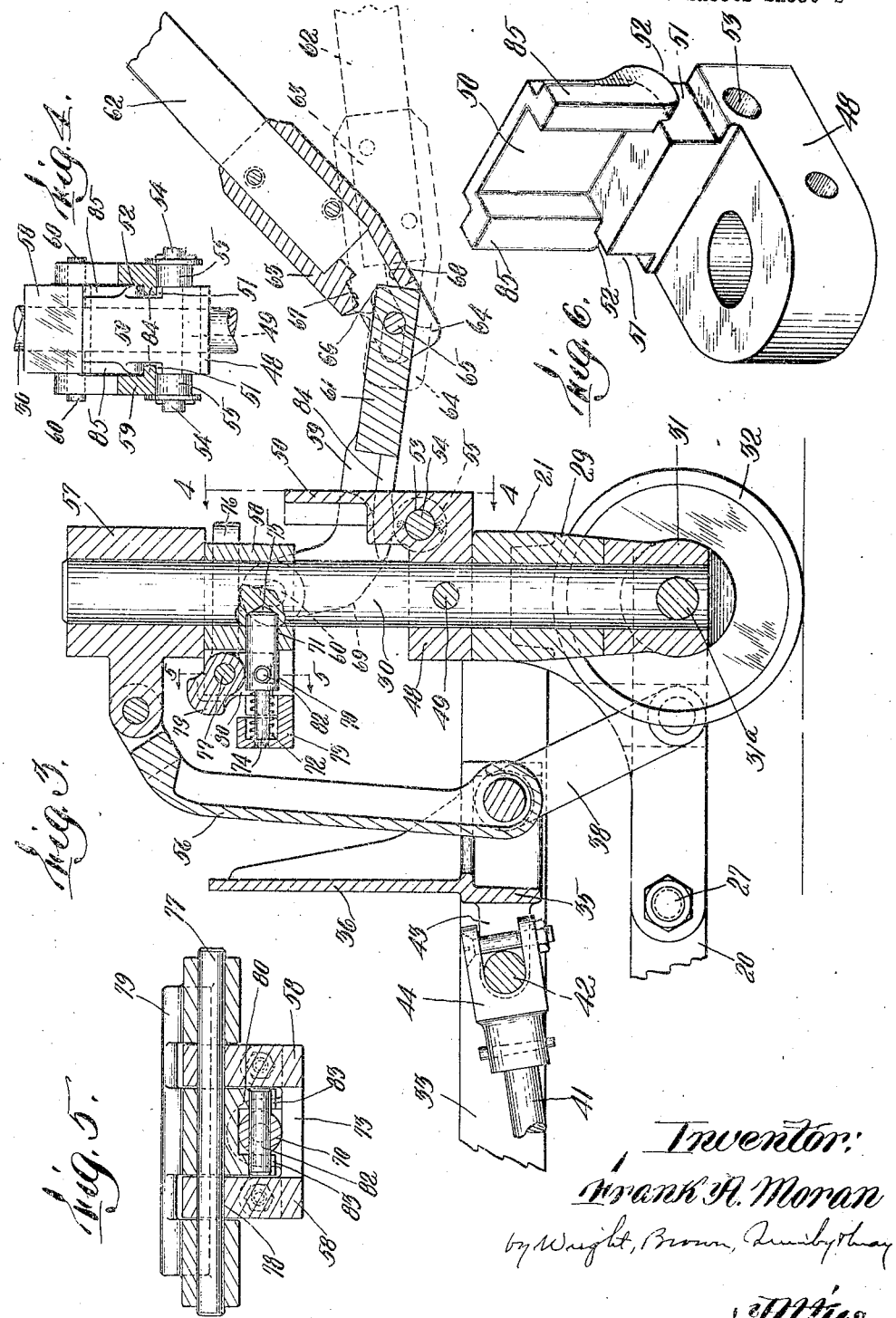

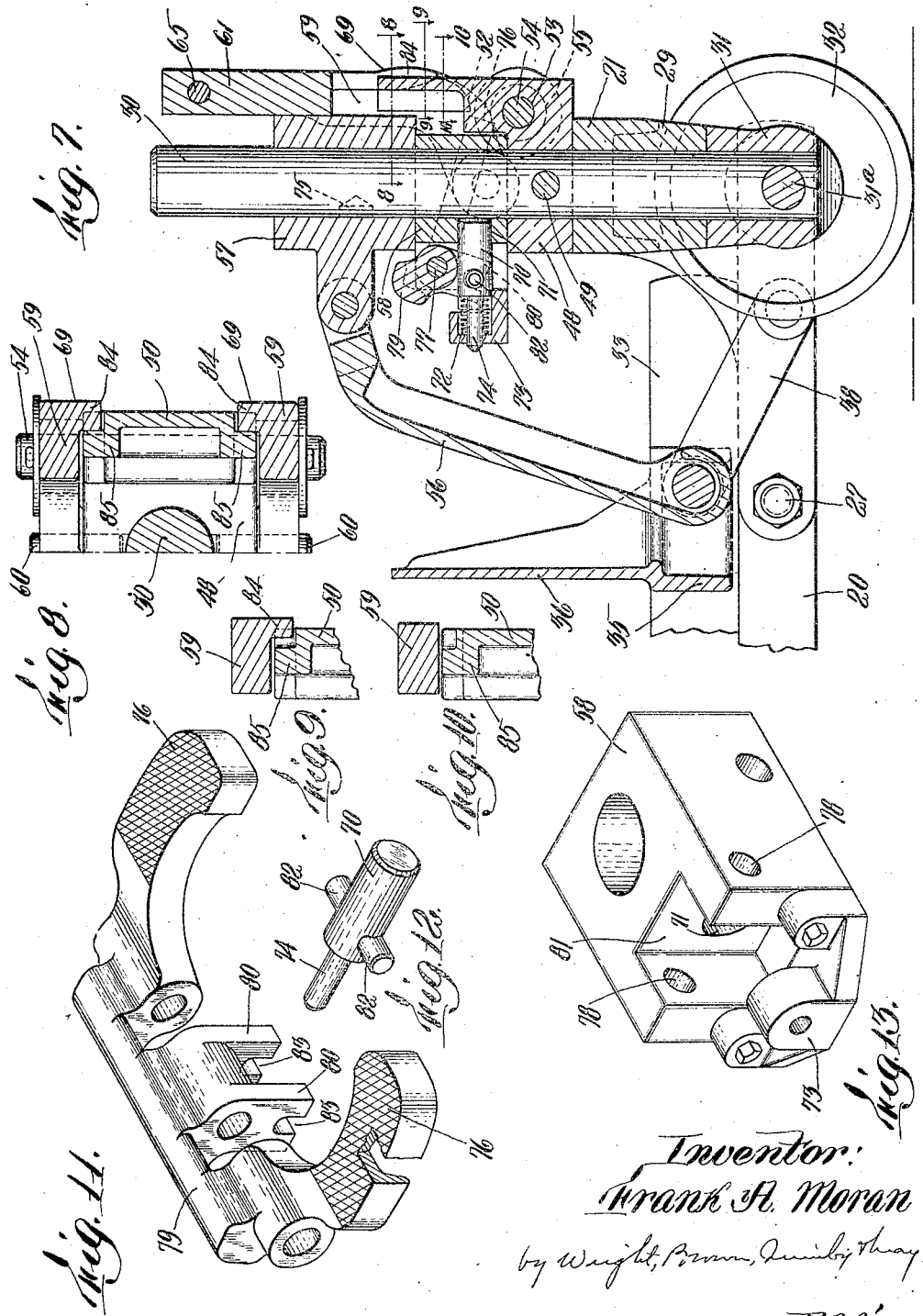

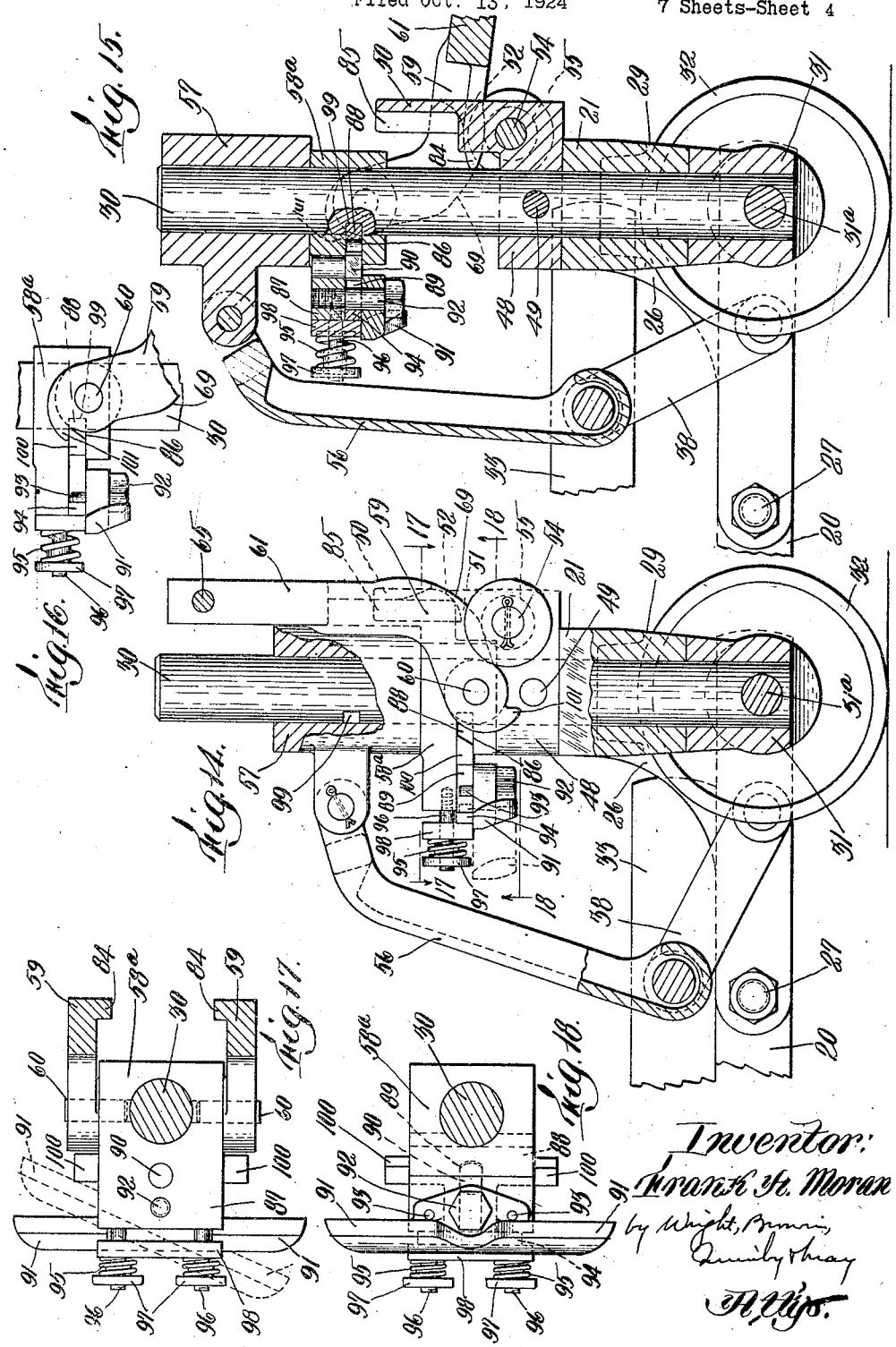

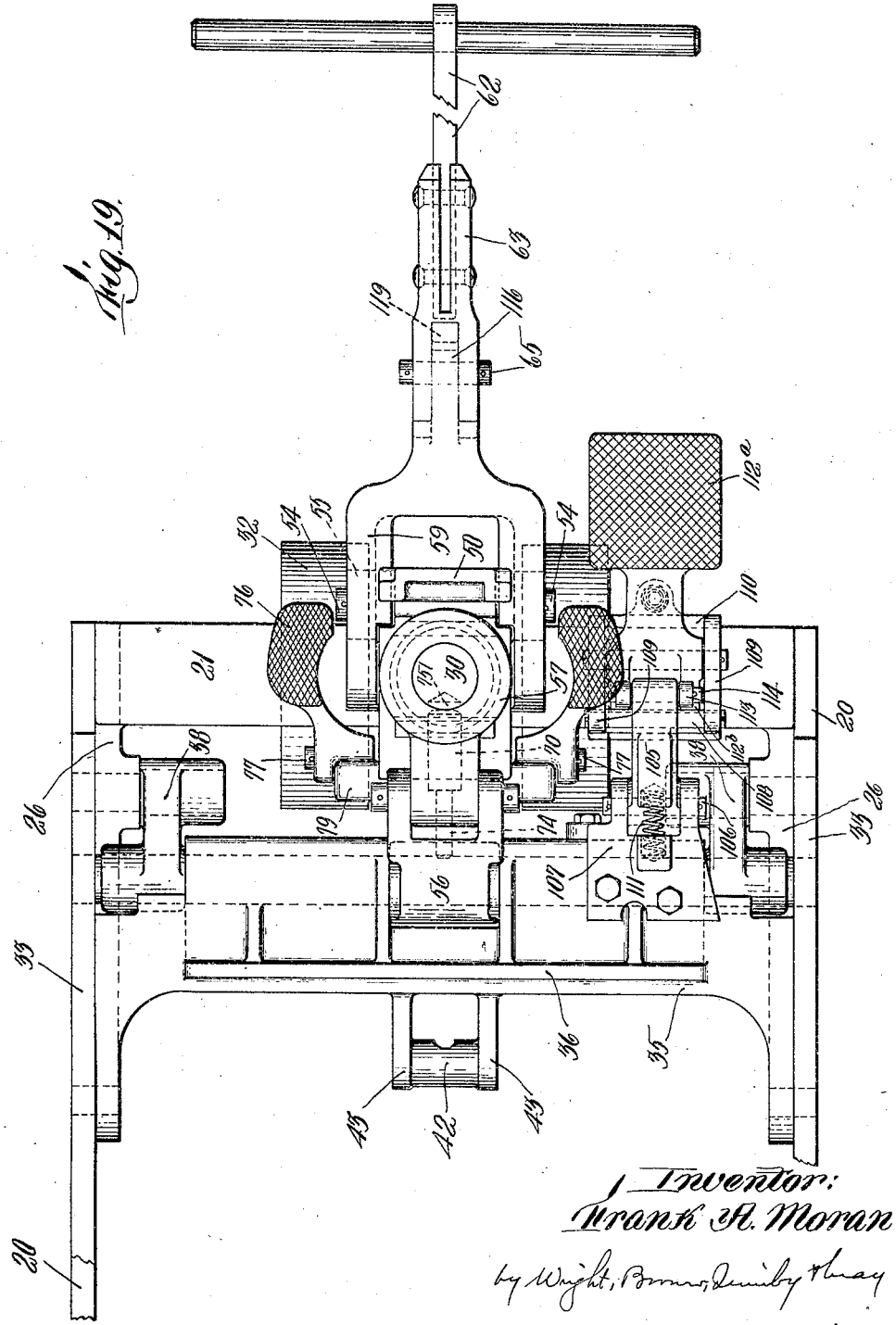

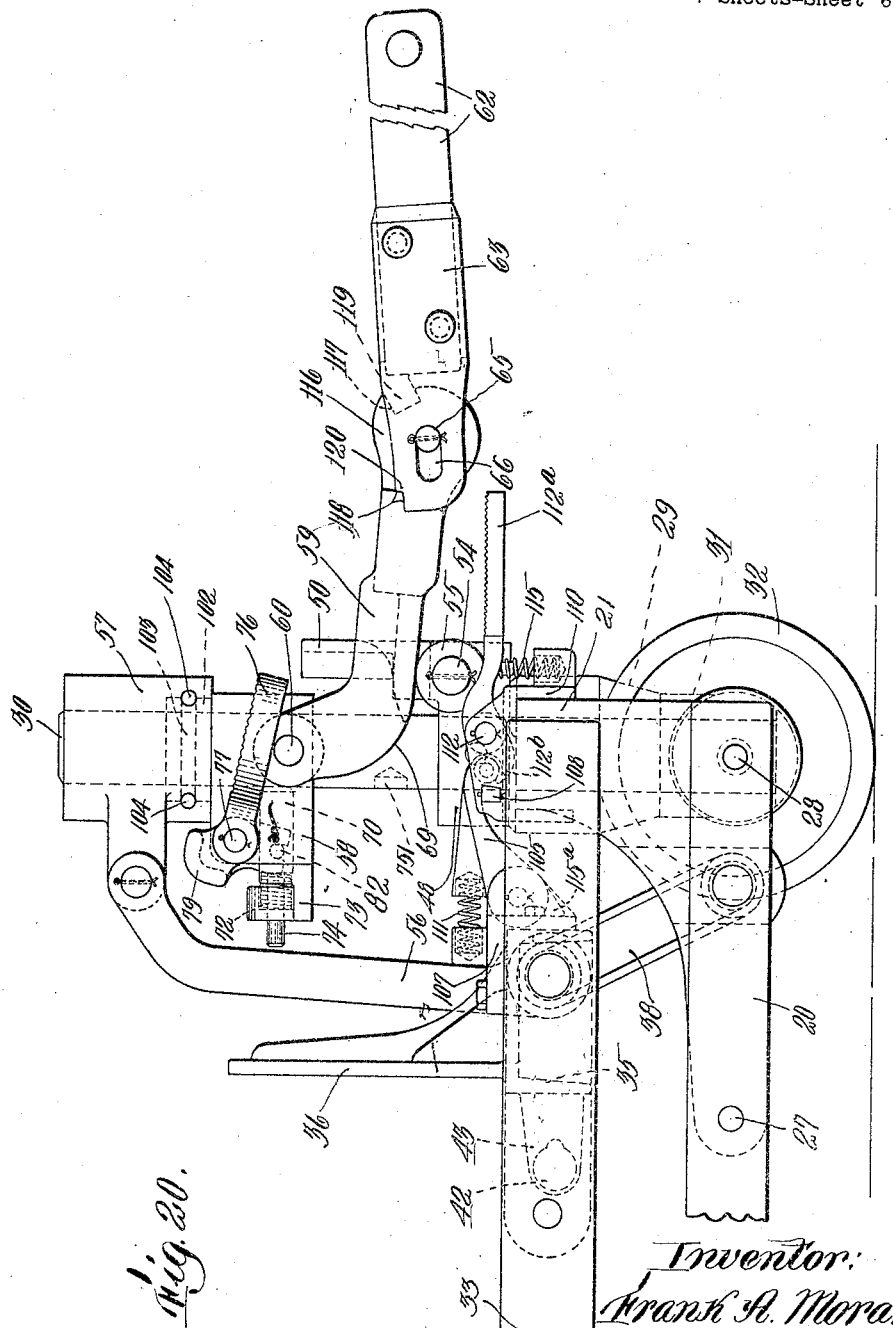

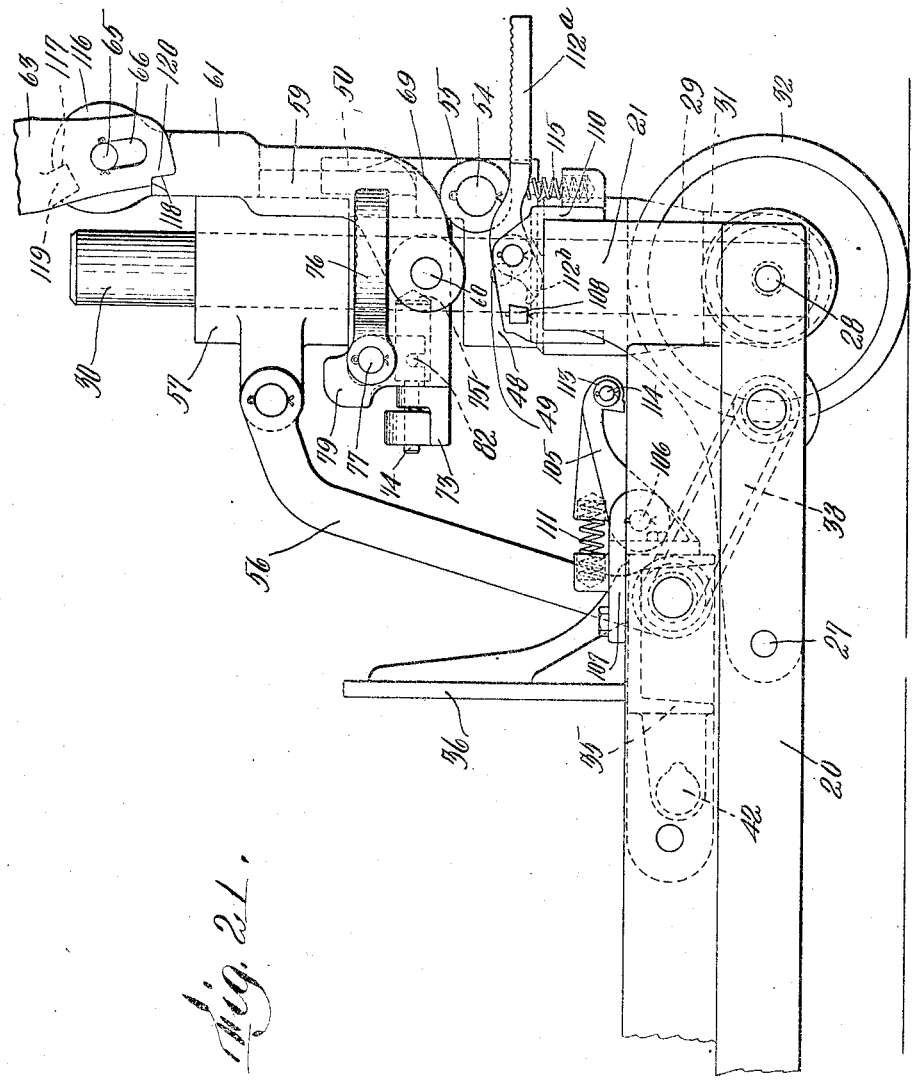

1,575,781

UNITED STATES PATENT OFFICE.

FRANK A. MORAN, OF SPRINGFIELD, MASSACHUSETTS, ASSIGNOR TO NATIONAL SCALE CORPORATION, OF CHICOPEE FALLS, MASSACHUSETTS, A CORPORATION OF MASSACHUSETTS.

ELEVATING TRUCK.

Application filed October 13, 1924. Serial No. 743,284.

*To all whom it may concern:*

Be it known that I, FRANK A. MORAN, a citizen of the United States, residing at Springfield, in the county of Hampden and State of Massachusetts, have invented new and useful Improvements in Elevating Trucks, of which the following is a specification.

The present invention relates to trucks of the sort which may be propelled and maneuvered by the muscular power of a man and are equipped with a platform adapted to be raised and lowered with respect to the main frame of the truck, so as to pick up loads from the ground and deposit them again on the ground without need of handling the load. Trucks of this general nature are now largely used in storehouses, factories, auditoriums, etc., for carrying goods from one place to another and to any final discharge point. These trucks are low, so that they can be backed in under boxes or cases of goods, or heavy unboxed pieces; and the pieces, boxes or the like to be transported are placed upon supports provided with legs or skids, or are themselves provided with legs or skids, of such height that when resting on the ground the bottoms of the goods, supports, etc., are high enough above the ground to permit of the truck being passed under them, with its platform in lowered position, but are not so high as the raised portion of the platform.

Such trucks, as heretofore made, have had certain defects, including, among others, difficulty in raising the truck platform with a heavy load upon it, and liability of tipping over the truck and its load, when attempting to raise the load from the ground while the handle or drawbar is turned at a sharp angle to the length of the truck.

The object of the present invention has been to improve the construction and mode of operation of trucks of this character so as, in the first place, to overcome the defects in trucks of prior constructions, and secondly to furnish additional improvements the character of which can best be explained with reference to a concrete embodiment of the invention.

Such an embodiment and an alternative construction of certain features thereof are shown in the drawings herewith furnished and are described in the following specification.

In the drawings,—

Figure 1 is a side elevation of a truck containing the various features of my invention in their preferred forms.

Figure 2 is a plan view of the same truck.

Figure 3 is a longitudinal central section on an enlarged scale taken on the line 3—3 of Figure 1.

Figure 4 is a detail sectional view taken on line 4—4 of Figure 3.

Figure 5 is a detail sectional view taken on line 5—5 of Figure 3.

Figure 6 is a perspective view of the part of the truck which is called the "swivel block."

Figure 7 is a sectional view similar to Figure 3, but showing the movable parts in the positions they occupy when the truck platform is lowered, Figure 3 on the other hand showing the same parts in the positions when said platform is raised.

Figure 8 is a cross section on line 8—8 of Figure 7.

Figures 9 and 10 are fragmentary cross sections on lines 9—9 and 10—10, respectively, of Figure 7.

Figure 11 is a perspective view of the release pedal.

Figure 12 is a perspective view of the locking bolt.

Figure 13 is a perspective view of the lock guiding block.

Figure 14 is a view similar to Figure 7 showing a truck having the same general characteristics as that shown in the preceding figures, but with a different character of lock for holding the elevating platform in raised position.

Figure 15 is a cross sectional view like that of Figure 14, but showing the movable parts in the positions assumed when the truck platform is raised and locked.

Figure 16 is a side elevation of the lock and associated parts when in the position represented in Figure 15.

Figure 17 is a cross section taken on line 17—17 of Figure 14 looking downward.

Figure 18 is a cross section taken on line 18—18 of Figure 14 looking upward.

Figure 19 is a plan view of the forward end of a truck of the same character, but having a different character of lock.

Figures 20 and 21 are elevations of the last mentioned truck showing the platform locked in raised and lowered positions, respectively.

Like reference characters designate the same parts wherever they occur in all the figures.

The body frame of the truck comprises two longitudinal side bars 20, a front cross-bar 21, a rear axle 22, and such additional cross-bars or tie-rods 23, 24 as may be needed for holding the principal members of the frame together and bracing them, or to serve as pivots, or for other purposes. Two rear wheels 25 are mounted on the rear axle as far apart as possible so as to afford a stable wheel base, but preferably inside of the side bars in order to permit passage of the truck through spaces little wider than its frame. The front cross-bar 21 lies at a higher elevation than the side bars in order to give room for the front wheel or wheels, and is provided at its ends with webs or wings 26 which are secured to the side bars by bolts 27, 28 or equivalent fastenings.

In the center of the cross-bar 21 is a boss 29 which is bored to furnish a bearing for an upright swivel shaft or king bolt 30 by which the front wheel or wheels are connected to the truck frame. The same shaft is a guide for the lifting mechanism by which the elevating platform is raised, and cooperates with a locking means to hold the lifting mechanism in elevated position. The lower end of said shaft passes below the bearing 29 and is connected to a fitting 31 carrying the axle 31ª for the front wheels 32. There are preferably two front wheels placed as far apart as possible (to give stability) consistently with the ability to turn through a wide angle about the axis of shaft 30 without interfering with the sides of the frame or the other connections presently described.

The platform or lifting frame of the truck, by which the load is supported and elevated, is made, in the construction here illustrated, of two side bars 33, a rear cross piece 34, and a front cross piece 35 having a rising web or plate 36 to limit the forward position of the load and prevent interference of the load with the lifting mechanism. The rear end of the platform is connected to the body frame by two links 37 which swivel about the rear axle, and its forward end is connected to the body by links 38 which swing about pivot studs mounted in the web 26 of the cross member 21. All of these links are connected by suitable pivots to the platform. In addition the frame and platform are connected by springs 39 which exert a constant tendency to lower the platform, and by a check device consisting of a cylinder 40 and a piston or plunger 41 which retards lowering movement of the platform and prevents such movement taking place suddenly under a heavy load. The cylinder is pivoted to the main frame by the cross rod 24, and the plunger or piston rod 41 is connected to the platform by a pin 42 which is held in ears 43 on the cross member 35 and is grasped by a yoke 44 on said rod.

Secured to the side bars of the lower frame by means of the cross rod 24 and rivets 45 are lugs 46 which cooperate with fingers 47 projecting downwardly from the side bars of the elevating platform so as to assist the links in guiding the platform, and to relieve the links and their pivots of twisting or bending strains due to side thrust when the platform is elevated. These lugs rise inside the side bars of the platform when the latter is lowered.

When the platform is lowered its side bars rest on the side bars of the frame, as shown in Figure 7, but when raised it is at a substantial height above the frame, as shown in Figures 1 and 3.

The lifting mechanism for raising the platform, the means for locking the platform in raised position, and the means for releasing the lock so that the platform may descend, will now be described. On the shaft or king bolt, directly above the cross bar 21, a piece 48 is secured to the shaft by a pin 49. This piece is called for convenience a "swivel block." It is provided at its forward extremity with an upstanding web or plate 50 in the sides of which are grooves 51. The upper extremities of these grooves are bounded by shoulders 52 which are curved conformably to the path of movement of certain locking webs on the later described lifting cam. Below the plate 50 there is a transverse hole 53 in the swivel block which receives a pin 54, the latter being the pivot for the abutment rolls 55.

The forward end of the elevating platform is connected by a link 56 with a block or sleeve 57 which has sliding movement on the shaft 30. This sleeve may be called for convenience of description the "lifting sleeve" or block. Below the lifting block another block 58 is slidingly mounted on the shaft, which I have called the "lock-holding block" for convenience of description. This lock-holding block is embraced by the arms of a forked lifting cam 59 and is pivoted to the ends of these arms by pivot pins 60. The arms of this cam merge together in a tongue 61 which is connected to a handle or draw-bar 62 in such a manner that force may be applied through the draw-bar so as to swing this forked cam about the pivots 60.

Preferably the connection between the draw-bar and cam is made by means of a piece 63 which I call a footpiece and have shown in detail in Figures 1, 2 and 3. This footpiece has a split socket in which the draw-bar is received and made fast, and it has also separated lugs 64 between which the tongue of the lifting cam passes. A pivot pin 65 extends through the tongue 61 and its ends are received in elongated slots 66 in these lugs. Within the footpiece is a socket bounded by walls 67 and 68 adapted to receive and embrace the tongue 61, into and out of which the latter may be passed by virtue of the movement permitted through the slots 66. When the walls of the socket are passed over the tongue as shown by dotted lines in Figure 3, the draw-bar and lifting cam are connected as a rigid unit for transmitting force angularly about the pivots 60, but when the socket is withdrawn from this tongue the draw-bar may be swung around the pivot pin 65.

The arms of the lifting cam rest on the abutment rolls 55, and they are so shaped as to permit the tongue of the cam to assume an upright position against the lifting block 57 and approximately parallel to the shaft 30, or to assume a position in which it is horizontal or even inclined below the horizontal. The lower surfaces 69 of the lifting cam arms are cam surfaces, the preferred outline of which is substantially that shown in Figures 1, 3, 7, 14, 15, 20 and 21, and such surfaces bear on the abutment rolls 55. The formation of these cam surfaces and their relation to the abutment rolls, to the draw-bar of the truck and to the path in which the lifting block moves, are important features of this invention.

When the elevating platform is lowered, the lock block 58 is close to the swivel block and the part of the cam to which the draw-bar is connected, and of which the draw-bar is an extension, projects vertically upward, or nearly so.

Inasmuch as the power applied for lifting the platform is the muscular force of a person applied through the draw-bar, and since the draw bar to be effective in guiding the truck and in elevating the load must have a substantial length, the position of the draw-bar when the platform is lowered is the least effective for the transmission of force to lift the load, and the force applied by the operator is necessarily exerted almost horizontally. He may partially counteract this pull by thrusting with his foot against the lower part of the truck at the same time that he pulls with his hands on the end of the draw-bar, but even then there is a considerable unbalanced force exerted horizontally and outwardly. If the truck wheels are turned at a sharp angle to the length of the truck, this horizontal unbalanced force tends to tip the truck over. The lifting cam is so designed, however, that force applied to the draw-bar in these unfavorable conditions is most efficiently converted into an upward thrust on the lifting block, because at that time the distance between the pivot 60 and the point of bearing of the lifting cam on the abutment rolls is the minimum, and the line between these points is approximately horizontal, while the leverage by which the operator applies force is the greatest.

The lifting cam may be considered as a lever of which the draw-bar is the long arm, the point of bearing on the abutment rolls is the fulcrum point, which shifts on the lever progressively along the cam surface 69 as the platform is raised, and the distance between the shifting fulcrum point and the pivot connection 60 is the short lever arm. As the platform continues to rise the draw-bar approaches the horizontal position until, when the weight of the load is borne by the platform, the draw-bar is so nearly horizontal that almost its full length is available as a long lever arm to receive the force and weight of the operator applied in the vertical direction.

A lock secures the platform in its elevated position. Various forms of lock may be applied for this purpose and I have shown three alternative forms in these drawings. The one shown in Figures 1 to 12 is a pin or bolt 70 mounted in a socket 71 in the block 58 and pressed upon by a spring 72 which reacts against a retainer 73 secured to the rear side of the lock block, as shown in Figures 3, 7 and 13. The locking bolt is provided with a tail-rod 74 which passes through the spring and the spring retainer, and is guided by the latter. The socket 71 which receives the locking pin opens into the passage in the lock block through which the shaft 30 extends and, therefore, the bolt is adapted to spring automatically into a recess 75 in the side of the shaft whenever it is raised to the height of said recess. As the shaft 30 is connected to the swivel block by the pin 49, and the swivel block and lock block 58 are interconnected by the forked lifting cam 59 and the plate 50 on the swivel block, all these parts turn in unison about the axis of the shaft whenever the draw-bar is moved sidewise to turn the front wheel, wherefore the bolt and locking recess are always in the same radial plane of the shaft and in position to interlock when the platform is lifted, no matter how the front wheel may be turned.

A pair of pedals 76 flank the lock block 58 are pivoted on a rod 77 which passes through alined holes 78 in the block. These pedals are connected together by a cross-bar 79, and to said bar are connected two lugs or forks 80 which straddle the locking bolt 70 and lie in the chamber formed in the rear side of the lock block 58. The ends 82 of a cross pin set in the locking bolt occupy notches 83 in the lugs or forked arms 80. Thus downward pressure applied to either pedal is effective to withdraw the bolt from its complemental locking recess.

The capacity of the lifting mechanism to raise the platform, and of the lock to enter its socket, no matter whether the front wheels are directed straight ahead or are turned to either side at any angle, are important features of this invention because they enable the truck to be operated so as to pick up a load in spaces which are only just wide enough to permit maneuvering of the truck and are not wide enough to permit the draw-bar to project straight ahead from the truck when moved down to elevate the platform.

In the interest of space economy the boxes or other loads which have to be moved in factories are usually placed with the least possible space between them and other boxes, walls, or machines. Such spaces may economically be made wide enough to permit passage of a truck and maneuvering of the truck so as to back it under a load, but could not without great waste of valuable space be made wide enough to accommodate the draw-bar when brought into lowered position in line with the truck. But the characteristic of my truck now being discussed enables the draw-bar to be manipulated in line with the narrow passageways so as to raise the platform and lock it in raised position while the truck itself extends at any angle to the passageway.

It has been previously noted that the lifting cam is a fork or yoke, the arms of which embrace the upright plate 50 of the swivel block 48. On the inner sides of these arms are webs 84 which lie in front of the wings 85 on the edges of the plate when the draw-bar is upright, and are adapted to pass through into the notches 51 and to underlie the shoulders 52 when the draw-bar is lowered, as shown in Figure 3. Then the lifting cam is locked so that it cannot swing about its pivot 60 when the draw-bar is pulled upon to draw the truck from place to place. If the lifting cam were not thus locked it would swing up and down as stress is applied, relaxed and reversed on the draw-bar, and would strike on the abutment rolls 55, to the injury of the contacting parts and making an objectionable noise. Besides, the interengagement of the cam with the swivel block causes the pull of the draw-bar to be applied through the swivel block to the shaft at a point close to the bearing of the latter in the frame; that is, at so low a point and so near the wheel base that there is little tendency to overturn the truck when the pull is applied toward one side.

Another form of lock for holding the platform elevated and for preventing swinging of the lifting cam under draw-bar pull is shown in Figures 14 to 18, all other parts of the truck, however, being the same as previously described. A lock block 58$^a$ of different form than the block 58 previously described slides upon the swivel shaft or king bolt and has a transverse slot 86 in its rear side which intersects the passage through which the swivel shaft extends, and above such slot the block is provided with a rear extension 87. A lock 88 occupies the slot 86 and has a slotted portion 89 into which extends a guide stud 90 set in the lock block. A cross bar 91 is swiveled to the lock block by a bolt 92, and lies below the portion 89 of the lock, its pivot bolt passing through the slot in said lock.

The cross bar carries two pins 93 at opposite sides of its swivel axis and these pins bear on lateral wings 94 projecting from the rear end of the lock. Springs 95 press the lock toward the swivel shaft, being placed upon rods 96 set into the lock block, and confined by abutment disks 97 fastened on said pins, while they press against a bar 98 which engages the end of the lock. Thus when the platform and the sliding parts are lowered, the lock bears against the side of the swivel shaft, but when they are raised until the lock comes opposite to a notch 99 in the shaft, the springs force the lock into this slot. The swiveled cross-bar 91 projects at each side of the lock block and each end is adapted to receive the thrust of the operator's foot, being, in effect, a treadle by which it may be rocked so as to cause one or the other of its pins 93 to press against the adjacent wing 94 of the lock and so retract the lock.

There is also a latch projection 100 extending to each side of the lock block from the lock adjacent to the pivot eyes of the lifting cam. These latch projections are adapted to interlock with hooks 101 on the lifting cam when the draw bar is depressed and the lock block is raised, whereby to prevent swinging of the lifting cam about its pivot, in cooperation with, or substitution for, the interlocking webs 84 and shoulders 52. Figures 14 and 15 show these webs and shoulders combined in the same lifting cam with the hooks, but so far as the prevention of swinging of the lifting cam under the pull of the draw bar is concerned, the hooks and latch projections are equivalent to the webs.

In the modification illustrated in Figures 19, 20 and 21 I have provided a form of lock substantially like that first described but arranged to act when the platform is lowered, whereby to prevent the platform from being raised by pull exerted on the draw-bar. The utility of thus locking the platform is found in conditions where the platform or skid holding the load has, when resting on the floor, but little clearance above the lowered platform of the truck, as it enables the truck to be drawn from under the load by pull of the draw bar.

This lock operating for this purpose is substantially like that first described, with the exception that the recess or bolt socket 75¹ is located at such a low point on the king bolt or swivel shaft 30 that it may be entered by the locking bolt when the platform is in fully lowered position, as shown in Figure 21. Also the block or sleeve which I have called the "lock-holding block" 58 is connected in a swiveled manner with the lifting sleeve 57. An extension 102 on the lock-holding block enters a recess in the lifting sleeve and is provided with an encircling groove 103 which is entered by the sides of two pins 104 driven into the side of the lifting sleeve. Then, although the lock-holding block may be turned with the king bolt relatively to the lifting sleeve, yet the latter is so connected with the block that, when the block is locked to the king bolt, the sleeve cannot ride up on the king bolt and so the platform cannot be raised. Then, although the lifting cam is in its upright position, wherein the pull applied by the draw-bar to move the truck tends to lower it and so raise the platform, yet such raising movement is impossible and the truck can thus be withdrawn from under a load by pull applied to the draw-bar, without possibility of the platform being so raised as to wedge under the load.

The means for holding the platform in the raised position here comprises a latch or hook 105 connected by means of a pivot pin 106 to a bracket 107 fastened to the front cross piece 35 of the platform. The hook end of this latch is designed to catch over a bar 108 held at its ends in two parallel webs 109 on a bracket 110 mounted on the front cross bar 21 of the body frame. A spring 111, acts between the latch and an abutment on the bracket 107, preferably in the form and arrangement as shown in the drawings, and holds the latch in a position where its forward hooked end will ride over, and snap down in front of the catch bar 108, in a location between the webs 109. The adjacent contacting surfaces of the latch hook and catch bar have a slight bevel of such a character as will make a secure and efficient lock, when these parts are thus engaged. As the connecting links for the lifting platform are inclined to the rear, even when the platform is lifted, the weight of the platform and its load tends constantly to lower the platform, and is resisted by the latch. The beveled formation of the latch and catch bar avoids all danger of the latch being disengaged by reason of the pull constantly exerted by such weight even though the truck should vibrate excessively in passing over rough ground.

For releasing the latch I have provided a treadle lever mounted on a pivot 112 between the lugs 109, which lever has a footpiece 112ª extending forwardly where it may be stepped upon by the operator, and two short arms or fingers 112ᵇ extending to the rear beneath the positions occupied by two anti-friction rolls 113 on a pin 114 which is carried by the forward end of the latch, when the latch is in its locking position. A spring 115 arranged between the treadle arm 112ª and an abutment on bracket 110, preferably in the manner shown in the drawings, normally holds the treadle lever (or latch release lever) in the position shown in the drawings, where the latch releasing fingers offer no obstruction to the engagement of the latch with the catch bar. These fingers and the adjacent part of the release lever then bear on the cross bar 21, and limit the position to which the release lever is returned after being stepped upon.

Similarly the latch 105 is limited as to the position which it assumes under pressure of spring 111, by means of a lug 105ª on the latch which bears against the forward side of the bracket 107 when the latch is clear of the catch bar, as shown in Figure 21. Then the forward end of the latch is able to ride up on the bracket 110 and over the catch bar 108 when the platform is raised.

When the latch is released in order to permit descent of the load carried by the truck, the hooked end of the latch must be forced across the beveled face of the catch bar against the resistance, not only of the pull caused by the weight of the load, but also of the minute lifting of the load occasioned by the bevel of the latch and bar. This resistance is easily overcome however by reason of the large ratio between the long pedal arm 112ª and the short arm comprised by the fingers 112ᵇ. This resistance is still further diminished, due to the fact that the fingers 112ᵇ act upon anti-friction rolls on the latch.

When by reason of wear the catch bar becomes unserviceable, it may easily be removed and a new one substituted, for this bar passes through holes in the webs 109 and its protruding ends are secured by cotter pins. Renewal of the latch itself when necessary is easily effected also by removal simply of its pivot, the ends of which pass through lugs on the bracket 107 are also secured by cotter pins; but the wear due to causes above indicated may be largely concentrated on the catch bar by making the latter of softer material than the hook part of the latch.

A lock such as that just described, which holds the platform in its elevated position, through reaction directly on the latch body of the truck and not at all upon the king bolt, is of advantage over the forms of lock for the same purpose previously described, in that the king bolt is not subjected to any lateral rearward stress applied by the loaded platform through the lifting link and sleeve 57. Thus the load, no matter how heavy it may be, has no tendency to bind the king bolt and resist its swivel movement. In the construction where the platform is locked to the king bolt when elevated, there is such a tendency, although it has no objectionable result under moderate loads.

Another modification here shown is concerned with the mode of connecting the draw bar with the lifting cam. Here the outer extremity of the lifting cam is formed as a disk 116 provided with a notch 117 in its edge, and at each side of this disk are shoulders 118. The foot piece of the draw bar flanks the disk 116 and has a tongue 119 which is adapted to enter the notch 117 and its forked ends have shoulders 120 which are adapted to engage with the shoulders 118. The pin and slot connection between the draw bar and lifting cam enable these dogs or shoulders to be engaged and disengaged with one another. As the dog 119 and notch 117 at one point, and the cooperating shoulders 118 and 120 at another point, positively connect the draw bar and lifting cam, when force is applied to elevate the load the pivot pin 65 is relieved of the pressure so applied and preserved for longer usefulness in its function of transmitting the draw bar pull to the truck.

In other particulars the construction shown in Figures 19 to 21 is substantially like the form of truck shown in Figures 1 to 12.

Although I have thus shown and described in complete detail specific forms of the invention, it is to be understood that I do not limit the protection which I claim specifically to such forms, and that various changes other than, or additional to, those described, in construction and arrangement of the various parts and elements of the truck, may be made without departure from the invention and the scope of protection which I have claimed for it.

It is to be understood, of course, that nothing in the foregoing specification is intended or to be construed as limiting the uses which the truck may be made to serve within the scope of the protection which I claim.

What I claim and desire to secure by Letters Patent is:

1. An elevating truck having a body frame and a lifting platform, a swiveled wheel, a shaft by which said wheel is mounted in the body frame, a lifting block arranged to slide on said shaft and connected to said lifting platform so as to raise the latter when raised itself, a lock block mounted to slide on said shaft beneath said lifting block, a lock carried by said lock block and adapted to interlock with said shaft when placed in a given position, a lifting cam pivoted to said lock block, and a cam abutment independently connected to the swivel shaft and arranged to receive the thrust of said cam.

2. An elevating truck comprising a body frame having a swiveled wheel, a swivel shaft coupling said wheel to the frame, an elevating platform, means guided by said shaft for lifting the platform, and a lock engageable with said shaft for holding said platform in one of its positions.

3. An elevating truck comprising a body frame having a swiveled wheel, a swivel shaft connecting said wheel with said frame, an elevating platform, a cam abutment connected to said swivel shaft so as to partake of all angular movements of the shaft about its axis, a sliding member arranged to travel on said shaft, a lifting cam pivoted to said sliding member and arranged to bear on said abutment, and means for transmitting movements of said sliding member to said platform.

4. An elevating truck comprising a body frame having a swiveled wheel, a swivel shaft connecting said wheel with said frame, an elevating platform, a cam abutment connected to said swivel shaft so as to partake of all angular movements of the shaft about its axis, a sliding member arranged to travel on said shaft, a lifting cam pivoted to said sliding member and arranged to bear on said abutment, means for transmitting movements of said sliding member to said platform, and means for locking said sliding member to said shaft when in one of its positions.

5. In a truck of the character described, an elevating platform, and lifting means for said platform comprising a member guided to rise and descend in a given path, a cam lever pivoted to said member, and an abutment on which said cam lever has a movable fulcrum bearing.

6. In a truck having an elevating platform, means for raising said platform which comprises a member guided to move up and down in a given path and means for transmitting upward movement from said member to the platform, a relatively stationary fulcrum abutment, and a cam lever pivoted to said member and having a cam surface at its under side resting on said fulcrum member, said cam lever having also an operating arm which extends upward when said guided member is in its lowermost position, and the cam surface of the cam lever being then so arranged that the line between its point of bearing on the fulcrum abutment and its connection with the guided member is approximately perpendicular to the path in which said member moves.

7. In a truck having an elevating platform, means for raising said platform which comprises a member guided to move up and down in a given path and means for transmitting upward movement from said member to the platform, a relatively stationary fulcrum abutment, and a cam lever pivoted to said member and having a cam surface at its under side resting on said fulcrum member, which cam surface is so disposed that the line between its point of contact with the abutment and the point at which force is applied by the cam to said guided member is approximately horizontal when the guided member is in its lowermost position and that the operating arm of said cam lever is approximately horizontal when the guided member is raised to its highest position.

8. In a truck having an elevating platform, means for raising said platform comprising a sliding member, a lifting cam coupled to said member, and a relatively stationary fulcrum abutment for said lifting cam; the lifting cam having an operating arm and being arranged to swing between the position where such arm is approximately upright when the sliding member is in its bottom position and substantially horizontal when said member is in its highest position.

9. An elevating truck comprising a body frame having a swiveled wheel, a swivel shaft connecting said wheel to said body, an elevating platform, means for lifting said platform comprising a slide arranged to travel on said shaft, a lifting cam lever connected to said slide, a fulcrum abutment for said cam lever connected to the shaft, and a draw bar connected to said cam lever, the cam lever being engaged with the swivel shaft so as to transmit lateral turning movement thereto from the draw bar, and being engaged with the slide so as to transmit lifting movement thereto from said draw bar.

10. An elevating truck comprising a body frame having a swiveled wheel, a swivel shaft connecting said wheel to said body, an elevating platform, means for lifting said platform comprising a slide arranged to travel on said shaft, a lifting cam lever connected to said slide, a fulcrum abutment for said cam lever connected to the shaft, and a draw bar connected to said cam lever, the cam being engaged with the swivel shaft so as to transmit lateral turning movement thereto from the draw bar, and being engaged with the slide so as to transmit lifting movement thereto from said draw bar, combined with a lock carried by said slide and adapted to interlock with said shaft when the slide has been placed at a given height.

11. In an elevating truck having a body and a swiveled wheel, an upright swivel shaft connecting said wheel to the body, a block fastened to said shaft and having an upright plate, a slide guided to move up and down on said shaft, a forked lifting cam embracing said upright plate and slide and pivoted to the latter, abutments mounted on said block with which the furcations of said lifting cam are engaged, a platform mounted on said body and connected with said slide to be raised when the slide is raised, means for locking said platform in elevated position, and interlocking means on said plate and furcations arranged to prevent swinging movement of the lifting cam about its connection with the slide when the platform is thus locked.

12. In an elevating truck, a frame, a swiveled supporting wheel for the frame, a swivel shaft connecting the wheel to the frame, an elevating platform, and common means for elevating said platform, drawing the truck and turning said shaft to steer the truck, consisting of a slide guided to move up and down on said shaft, a swivel block connected to the swivel shaft and having an upright projection and lateral fulcrum abutments, a draw bar and a forked lifting cam connected to said draw bar, the furcations of said cam embracing said upright projection, resting on said abutment and being pivoted to said slide.

13. A truck as set forth in claim 12 combined with means for so locking the lifting cam when the slide is elevated as to prevent swinging movement of the lifting cam about its connection with the slide at that time.

14. In an elevating truck, a platform, a lifting member guided to move up and down, means for transmitting lifting movement from said member to the platform, a lifting cam pivoted to the guided member and having a tongue, an abutment for said cam; the cam being so constructed that its tongue is upright when the platform is lowered and projects horizontally forward when the platform is raised, a draw-bar pivoted to said tongue with provision for back and forth movement and having a socket into which the tongue may be entered to make the draw-bar a rigid extension of the cam, and means for locking the cam when its tongue is lowered, whereby to prevent it from swinging about its pivot.

In testimony whereof I have affixed my signature.

FRANK A. MORAN.